US012572553B1

(12) United States Patent
Sherman et al.

(10) Patent No.: US 12,572,553 B1
(45) Date of Patent: Mar. 10, 2026

(54) SYSTEMS FOR ITERATIVE POPULATION, QUERY PROCESSING, AND RELEVANCE RANKING OF GOVERNMENTAL DATA ACROSS HETEROGENEOUS DATABASES AND METHODS OF USE THEREOF

(71) Applicant: AJ Press, LLC, Sherman Oaks, CA (US)

(72) Inventors: Jacob Scott Sherman, Washington, DC (US); Rachel Schindler, New York, NY (US); Brandon Chiazza, Penfield, NY (US); Diego Fernando Martinez Ayala, Cundinamarca (CO)

(73) Assignee: AJ Press, LLC, Sherman Oaks, CA (US)

( * ) Notice: Subject to any disclaimer, the term of this patent is extended or adjusted under 35 U.S.C. 154(b) by 85 days.

(21) Appl. No.: 19/221,957

(22) Filed: May 29, 2025

(51) Int. Cl.
| | |
|---|---|
| *G06F 16/2457* | (2019.01) |
| *G06F 16/21* | (2019.01) |
| *G06F 16/22* | (2019.01) |
| *G06F 16/2452* | (2019.01) |
| *G06F 16/901* | (2019.01) |

(52) U.S. Cl.
CPC ...... *G06F 16/24578* (2019.01); *G06F 16/212* (2019.01); *G06F 16/2237* (2019.01); *G06F 16/2452* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 2017/0019487 A1* | 1/2017 | Maheshwari | ........... H04L 67/51 |
| 2023/0350885 A1* | 11/2023 | Lai | .................... G06F 16/24522 |
| 2025/0217428 A1* | 7/2025 | Pedersen | ............. G06F 16/2237 |

* cited by examiner

*Primary Examiner* — Umar Mian
(74) *Attorney, Agent, or Firm* — Greenberg Traurig, LLP

(57) ABSTRACT

A system and method for iteratively populating, querying, and ranking governmental data across heterogeneous databases may include iteratively populating at least one database with governmental data elements by obtaining source data from governmental data sources at predefined times, transforming the source data using at least one database schema, and populating the database, which may be a vector, relational, or graph database. A user query is received, comprising a query string, and processed using a routing agent to determine the data type or semantic scope and select at least one agent from a plurality of agents, including structured data agents, unstructured data agents, graph data agents, semantic search agents, validation agents, bias mitigation agents, or fallback agents. The query is modified using metadata, executed to retrieve responses, and input into a relevance machine learning model to determine relevance scores and rank responses. Ranked query responses are outputted to the user.

24 Claims, 11 Drawing Sheets

Web page 300

Ask me anything.....

305

Web page 300

What has Congress said about renewable energy in the last year?

305

Figure 3C:
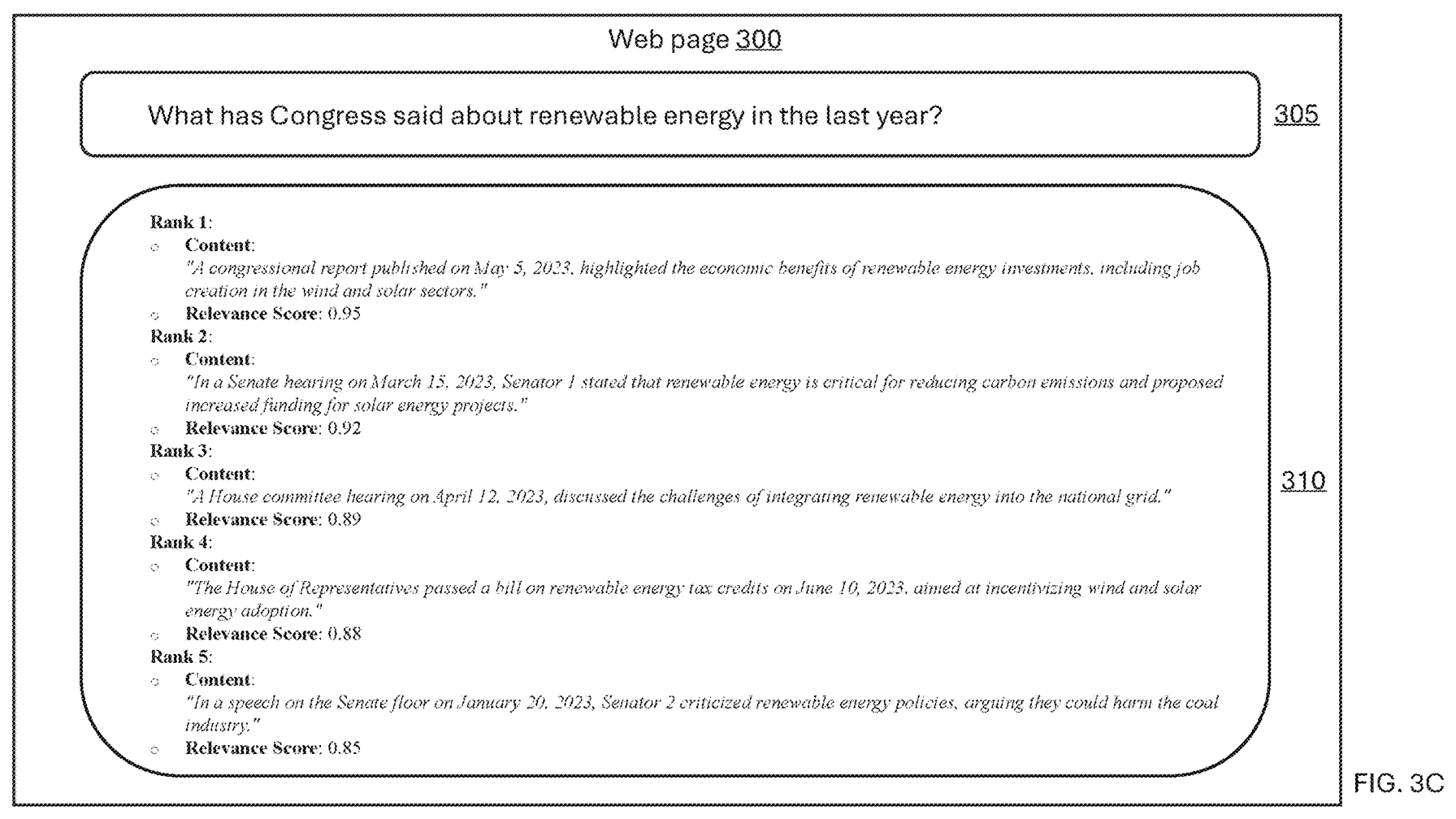

Web page 300

What has Congress said about renewable energy in the last year?

305

310

Rank 1:
- Content:
  "A congressional report published on May 5, 2023, highlighted the economic benefits of renewable energy investments, including job creation in the wind and solar sectors."
- Relevance Score: 0.95

Rank 2:
- Content:
  "In a Senate hearing on March 15, 2023, Senator 1 stated that renewable energy is critical for reducing carbon emissions and proposed increased funding for solar energy projects."
- Relevance Score: 0.92

Rank 3:
- Content:
  "A House committee hearing on April 12, 2023, discussed the challenges of integrating renewable energy into the national grid."
- Relevance Score: 0.89

Rank 4:
- Content:
  "The House of Representatives passed a bill on renewable energy tax credits on June 10, 2023, aimed at incentivizing wind and solar energy adoption."
- Relevance Score: 0.88

Rank 5:
- Content:
  "In a speech on the Senate floor on January 20, 2023, Senator 2 criticized renewable energy policies, arguing they could harm the coal industry."
- Relevance Score: 0.85

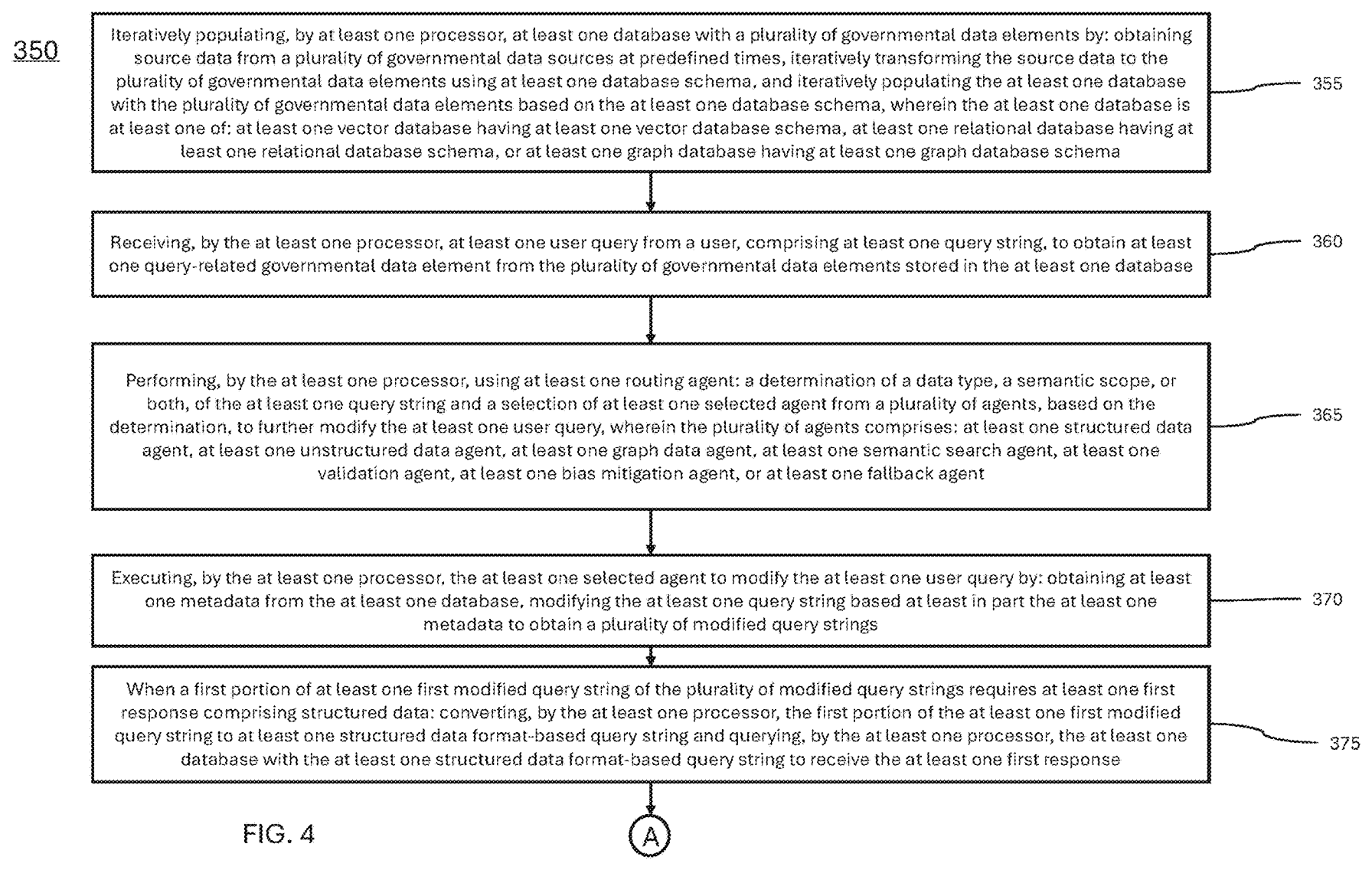

Iteratively populating, by at least one processor, at least one database with a plurality of governmental data elements by: obtaining source data from a plurality of governmental data sources at predefined times, iteratively transforming the source data to the plurality of governmental data elements using at least one database schema, and iteratively populating the at least one database with the plurality of governmental data elements based on the at least one database schema, wherein the at least one database is at least one of: at least one vector database having at least one vector database schema, at least one relational database having at least one relational database schema, or at least one graph database having at least one graph database schema

360

Receiving, by the at least one processor, at least one user query from a user, comprising at least one query string, to obtain at least one query-related governmental data element from the plurality of governmental data elements stored in the at least one database

365

Performing, by the at least one processor, using at least one routing agent: a determination of a data type, a semantic scope, or both, of the at least one query string and a selection of at least one selected agent from a plurality of agents, based on the determination, to further modify the at least one user query, wherein the plurality of agents comprises: at least one structured data agent, at least one unstructured data agent, at least one graph data agent, at least one semantic search agent, at least one validation agent, at least one bias mitigation agent, or at least one fallback agent

370

Executing, by the at least one processor, the at least one selected agent to modify the at least one user query by: obtaining at least one metadata from the at least one database, modifying the at least one query string based at least in part the at least one metadata to obtain a plurality of modified query strings

375

When a first portion of at least one first modified query string of the plurality of modified query strings requires at least one first response comprising structured data: converting, by the at least one processor, the first portion of the at least one first modified query string to at least one structured data format-based query string and querying, by the at least one processor, the at least one structured data format-based query string to receive the at least one first response (A)

FIG. 4

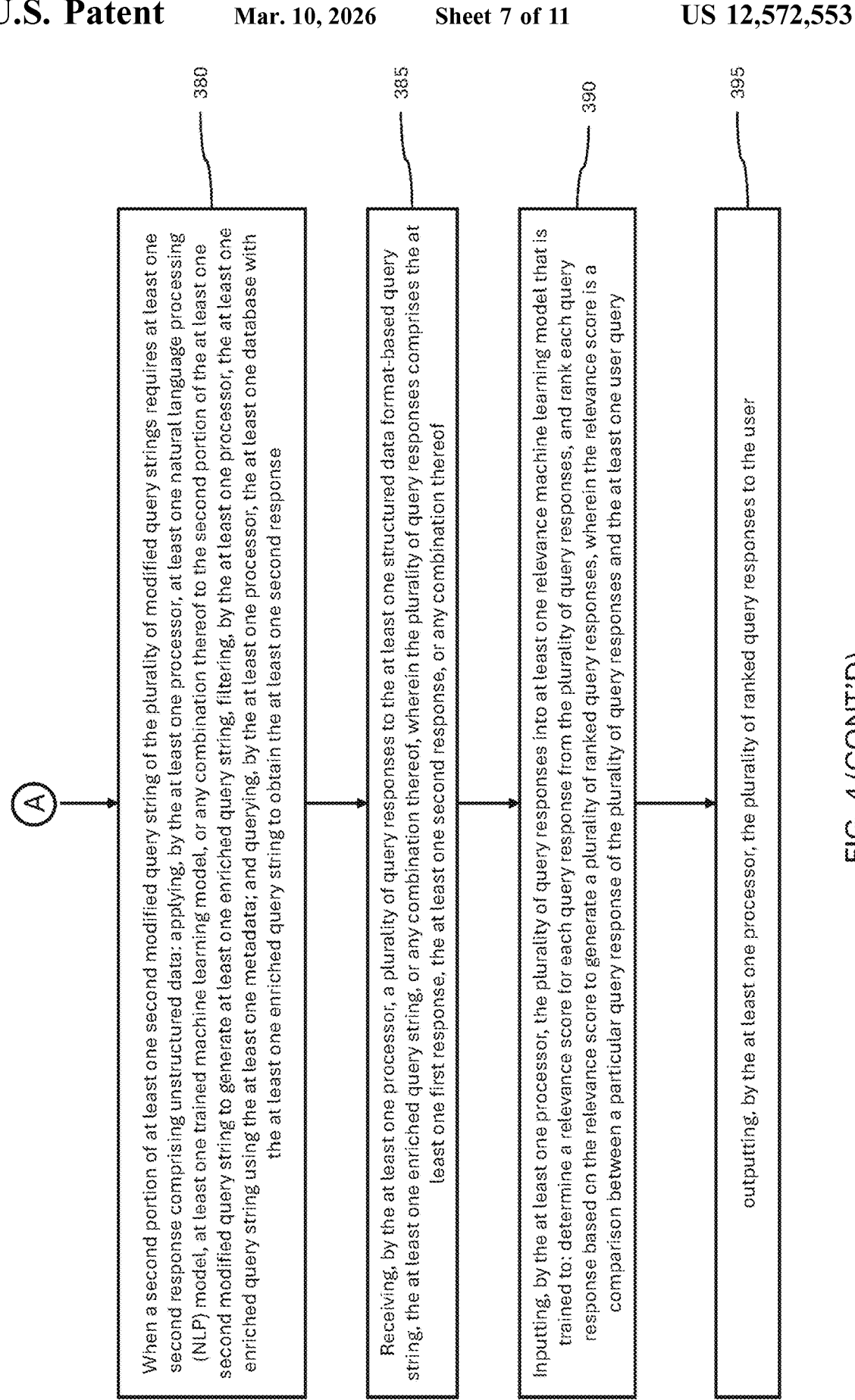

Ⓐ

380 — When a second portion of at least one second modified query string of the plurality of modified query strings requires at least one second response comprising unstructured data: applying, by the at least one processor, at least one natural language processing (NLP) model, at least one trained machine learning model, or any combination thereof to the second portion of the at least one second modified query string to generate at least one enriched query string, filtering, by the at least one processor, the at least one enriched query string using the at least one metadata; and querying, by the at least one processor, the at least one database with the at least one enriched query string to obtain the at least one second response 385 — Receiving, by the at least one processor, a plurality of query responses to the at least one structured data format-based query string, the at least one enriched query string, or any combination thereof, wherein the plurality of query responses comprises the at least one first response, the at least one second response, or any combination thereof 390 — Inputting, by the at least one processor, the plurality of query responses into at least one relevance machine learning model that is trained to: determine a relevance score for each query response from the plurality of query responses, and rank each query response based on the relevance score to generate a plurality of ranked query responses, wherein the relevance score is a comparison between a particular query response of the plurality of query responses and the at least one user query 395 — outputting, by the at least one processor, the plurality of ranked query responses to the user

FIG. 4 (CONT'D)

SYSTEMS FOR ITERATIVE POPULATION, QUERY PROCESSING, AND RELEVANCE RANKING OF GOVERNMENTAL DATA ACROSS HETEROGENEOUS DATABASES AND METHODS OF USE THEREOF

FIELD OF THE DISCLOSURE

The present disclosure generally relates to computer-based systems configured for querying, processing, and ranking governmental data across heterogeneous databases and methods of use thereof.

BACKGROUND OF THE DISCLOSURE

The increasing availability of governmental data from diverse sources, such as legislative records, regulatory filings, and public speeches, has created a need for systems capable of efficiently processing, querying, and analyzing such data. Traditional database systems often struggle to integrate structured, unstructured, and graph-based data, leading to inefficiencies in data retrieval and analysis. Furthermore, user queries often require nuanced processing to ensure relevance, accuracy, and bias mitigation.

The present disclosure addresses these challenges by providing a method for iteratively populating heterogeneous databases with governmental data elements, processing user queries using a multi-agent system, and ranking query responses based on relevance. The disclosure leverages vector, relational, and graph databases, along with advanced machine learning models, to deliver accurate and contextually relevant responses to user queries.

SUMMARY

In some embodiments, the present disclosure provides an exemplary technically improved computer-based method that includes at least the following steps of iteratively populating, by at least one processor, at least one database with a plurality of governmental data elements by: obtaining source data from a plurality of governmental data sources at predefined times, iteratively transforming the source data to the plurality of governmental data elements using at least one database schema, and iteratively populating the at least one database with the plurality of governmental data elements based on the at least one database schema. The at least one database is at least one of: at least one vector database having at least one vector database schema, at least one relational database having at least one relational database schema, or at least one graph database having at least one graph database schema. The at least one processor may receive at least one user query from a user that may include at least one query string, to obtain at least one query-related governmental data element from the plurality of governmental data elements stored in the at least one database. The at least one processor may perform using at least one routing agent: a determination of a data type, a semantic scope, or both, of the at least one query string and a selection of at least one selected agent from a plurality of agents, based on the determination, to further modify the at least one user query. The plurality of agents may include: at least one structured data agent, at least one unstructured data agent, at least one graph data agent, at least one semantic search agent, at least one validation agent, at least one bias mitigation agent, or at least one fallback agent. The at least one processor may execute the at least one selected agent to modify the at least one user query by: obtaining at least one metadata from the at least one database, and modifying the at least one query string based at least in part the at least one metadata to obtain a plurality of modified query strings. When a first portion of at least one first modified query string of the plurality of modified query strings requires at least one first response comprising structured data, the at least one processor may convert the first portion of the at least one first modified query string to at least one structured data format-based query string and may query the at least one database with the at least one structured data format-based query string to receive the at least one first response. When a second portion of at least one second modified query string of the plurality of modified query strings requires at least one second response comprising unstructured data: the at least one processor may apply at least one natural language processing (NLP) model, at least one trained machine learning model, or any combination thereof to the second portion of the at least one second modified query string to generate at least one enriched query string, may filter the at least one enriched query string using the at least one metadata, and may query the at least one database with the at least one enriched query string to obtain the at least one second response. The at least one processor may receive a plurality of query responses to the at least one structured data format-based query string, the at least one enriched query string, or any combination thereof. The plurality of query responses may include the at least one first response, the at least one second response, or any combination thereof. The at least one processor may input the plurality of query responses into at least one relevance machine learning model that is trained to: determine a relevance score for each query response from the plurality of query responses, and rank each query response based on the relevance score to generate a plurality of ranked query responses. The relevance score may be a comparison between a particular query response of the plurality of query responses and the at least one user query. The at least one processor may output the plurality of ranked query responses to the user.

In some embodiments, the present disclosure provides an exemplary technically improved computer-based system that includes at least the following components of at least one memory for storing instructions and at least one processor in communication with the at least one memory. The at least one processor may be configured to execute the instructions to iteratively populate at least one database with a plurality of governmental data elements by: obtaining source data from a plurality of governmental data sources at predefined times, iteratively transforming the source data to the plurality of governmental data elements using at least one database schema, and iteratively populating the at least one database with the plurality of governmental data elements based on the at least one database schema; where the at least one database may be at least one of: at least one vector database having at least one vector database schema, at least one relational database having at least one relational database schema, or at least one graph database having at least one graph database schema, to receive at least one user query from a user, comprising at least one query string, to obtain at least one query-related governmental data element from the plurality of governmental data elements stored in the at least one database, to perform using at least one routing agent: a determination of a data type, a semantic scope, or both, of the at least one query string and a selection of at least one selected agent from a plurality of agents, based on the determination, to further modify the at least one user query; where the plurality of agents may include: at least one structured data agent, at least one unstructured data agent, at least one graph data agent, at least one semantic search agent, at least one validation agent, at least one bias mitigation agent, or at least one fallback agent; to execute the at least one selected agent to modify the at least one user query by: obtaining at least one metadata from the at least one database, and modifying the at least one query string based at least in part the at least one metadata to obtain a plurality of modified query strings. When a first portion of at least one first modified query string of the plurality of modified query strings requires at least one first response comprising structured data, the at least one processor may be configured to convert the first portion of the at least one first modified query string to at least one structured data format-based query string and query the at least one database with the at least one structured data format-based query string to receive the at least one first response. When a second portion of at least one second modified query string of the plurality of modified query strings requires at least one second response may include unstructured data, the at least one processor may be configured to apply at least one natural language processing (NLP) model, at least one trained machine learning model, or any combination thereof to the second portion of the at least one second modified query string to generate at least one enriched query string; filter the at least one enriched query string using the at least one metadata; and query the at least one database with the at least one enriched query string to obtain the at least one second response. The at least one processor may be configured to receive a plurality of query responses to the at least one structured data format-based query string, the at least one enriched query string, or any combination thereof; where the plurality of query responses may include the at least one first response, the at least one second response, or any combination thereof, to input the plurality of query responses into at least one relevance machine learning model that is trained to: determine a relevance score for each query response from the plurality of query responses, and rank each query response based on the relevance score to generate a plurality of ranked query responses; where the relevance score may be a comparison between a particular query response of the plurality of query responses and the at least one user query; and to output the plurality of ranked query responses to the user.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3C is a graphical user interface screenshot illustrating ranked query responses with relevance scores based on a user query in accordance with one or more embodiments of the present disclosure;

FIG. 4 is a flowchart of a method 350 for querying, processing, and ranking governmental data across heterogeneous databases in accordance with one or more embodiments of the present disclosure;

DETAILED DESCRIPTION OF THE DISCLOSURE

Figure 1:
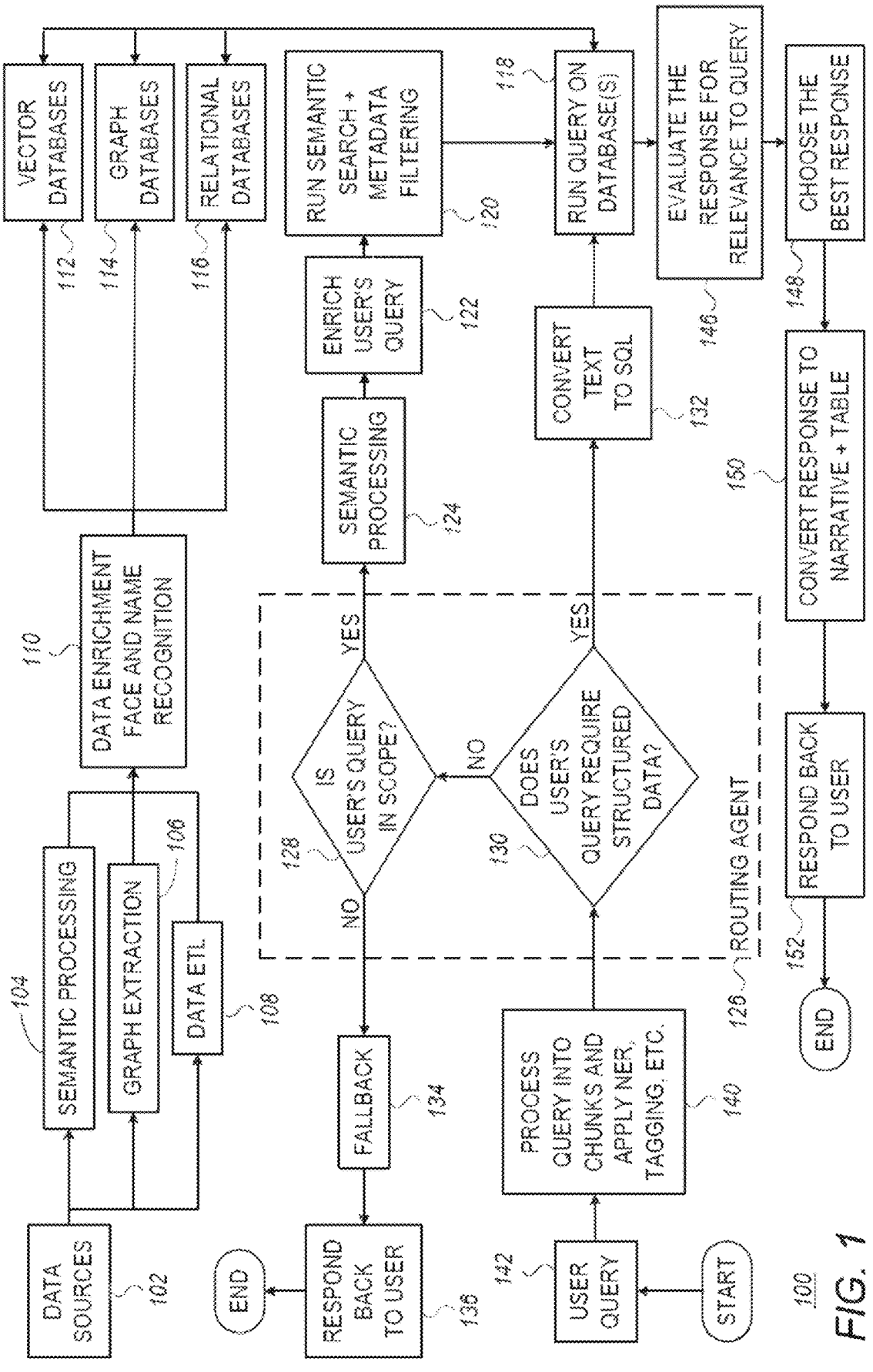
FIG. 1 is a flow chart diagram illustrating the querying, processing, and ranking system for governmental data across heterogeneous databases in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

The present disclosure relates to systems and methods for processing, querying, and ranking data across heterogeneous databases, for governmental and legislative data. The described system may integrate advanced computational techniques, including multi-agent orchestration, real-time ontology updates, intelligent query routing, and bias mitigation, to provide accurate, contextually relevant responses to user queries. By leveraging vector, relational, and graph databases, along with machine learning models, the described approach may address challenges in managing structured and unstructured data, ensuring efficient retrieval, validation, and ranking of query responses.

The embodiments described herein are illustrative and not limiting. While specific examples, configurations, and processes may be provided to facilitate understanding, those skilled in the art will recognize that various modifications, rearrangements, and substitutions may be made without departing from the scope of the described subject matter The described subject matter is intended to include such variations and adaptations that align with the spirit and scope of the appended claims.

The increasing availability of governmental data from diverse sources, such as legislative records, regulatory filings, and public speeches, may present challenges in efficiently processing, querying, and analyzing such data. Traditional database systems often struggle to integrate structured, unstructured, and graph-based data, leading to inefficiencies in data retrieval and analysis. Moreover, user queries may frequently use nuanced processing to ensure relevance, accuracy, and bias mitigation. Existing retrieval systems, such as those employing retrieval-augmented generation (RAG) techniques or static knowledge graphs, often lack the dynamic adaptability and multi-agent orchestration necessary to manage the complexity and evolving nature of governmental data. These systems may also suffer from data drift, hallucinations, and/or biases, which undermine the reliability and contextual relevance of their responses.

The present disclosure herein addresses these limitations by introducing a novel system and method for iteratively populating heterogeneous databases with governmental data elements, processing user queries using a multi-agent orchestration framework, and ranking query responses based on relevance. The described system may integrate vector, relational, and graph databases, each serving distinct roles in managing unstructured, structured, and relational metadata, respectively. A dynamic ontology framework may ensure real-time updates to entity relationships, enabling the system to adapt to new legislative events, such as votes, bills, and speeches. This ontology-driven approach may prevent misinformation and may ensure consistency across database types.

In some embodiments, user queries may be processed through a multi-agent system comprising specialized agents, including but are not limited to structured data agents, unstructured data agents, semantic search agents, validation agents, bias mitigation agents, and fallback agents. These agents may collaboratively modify and optimize user queries by leveraging metadata extracted from the databases. For example, metadata such as entity relationships, timestamps, and source identifiers may be used to enrich query strings, filter results, and enhance the accuracy of responses. The system may employ advanced machine learning models, including natural language processing (NLP) models and relevance machine learning models, to generate enriched query strings, evaluate query responses, and rank them based on relevance scores. This ranking mechanism may ensure that the most contextually relevant and accurate responses may be presented to the user.

Additionally, the described system may incorporate robust bias mitigation techniques through multi-agent validation. Independent agents may cross-check retrieved results to detect inconsistencies, reduce hallucinations, and/or ensure factual accuracy. By employing consensus-based validation and probabilistic methods, the system may minimize bias and may enhance reliability of its outputs. The described architecture may also include mechanisms for query augmentation, intelligent routing, and/or real-time ontology updates, which may collectively optimize retrieval efficiency and accuracy.

Thus, the disclosed system may represent an advancement over conventional approaches by seamlessly integrating heterogeneous databases, employing multi-agent orchestration, and leveraging dynamic ontology updates to deliver accurate, unbiased, and contextually relevant responses to user queries. This innovative framework may address the challenges of managing complex governmental data while ensuring scalability, adaptability, and reliability in data processing and retrieval.

FIG. 1 is an algorithmic flow diagram 100 of a querying, processing, and ranking (QPR) system of governmental data across heterogeneous databases in accordance with one or more embodiments of the present disclosure. FIG. 1 may illustrate the interconnected components of the described system, where the processes involved in querying, processing, and responding to user queries using heterogeneous databases and advanced computational techniques are detailed.

In some embodiments, data sources 102 may serve as the foundational input layer for the system. The data sources 102 may include, but are not limited to, diverse governmental datasets such as with data related to bills, bill committees, bill text, bill summaries, bill cosponsors, bill amendments, bill actions, committee meetings, committee member, congressional records, current congress details, congressional staff directories, current congress details, hearings, hearing committees, transcripts, voting records (house roll call votes/votes details, Senate roll call votes/votes details), laws, legislative records, members of Congress, party history, specific news sites related to Congress, congressional term history, regulatory filings, public speeches, and/or metadata from external providers like LegiStorm.

In some embodiments, the data sources 102 may be categorized into structured, unstructured, and/or graph-based formats to enable the system to manage a wide range of data types. Accordingly, the data sources 102 may interact directly with downstream components, such as semantic processing 104 and graph extraction 106, to ensure that raw data may be transformed into actionable insights. In some embodiments, the system may periodically ingest data from these sources at predefined intervals to ensure real-time updates and consistency across the databases.

In some embodiments, the semantic processing 104 component may be configured to analyze and interpret the raw data obtained from the data sources 102. In some embodiments, natural language processing (NLP) models and machine learning algorithms may be implemented to extract semantic meaning from unstructured data, for example, speeches or text documents. As a result, the semantic processing 104 component may identify entities, relationships, and/or contextual information, which may then be passed to the graph extraction 106 and data (Extract, Transform, and Load) ETL 108 components. In some embodiments, this step may ensure that the data may be enriched with metadata, such as timestamps, entity relationships, and/or source identifiers, thereby facilitating downstream query optimization and relevance ranking.

In some embodiments, the graph extraction 106 component may be arranged to transform the semantically processed data into a graph-based format. In some embodiments, this transformation may create nodes and edges that represent entities and their relationships, forming a dynamic ontology framework updated at predefined times to reflect changes in legislative events, such as new bills, votes, and/or speeches. Accordingly, the graph extraction 106 component may interact closely with graph databases 114 to ensure that the ontology may remain consistent and accurate. In some embodiments, this component may further serve as an step in linking structured and unstructured data, thereby enabling their seamless integration across heterogeneous databases.

In some embodiments, the data ETL 108 component may be implemented to process structured data retrieved from the data sources 102, such as tables and spreadsheets. In some embodiments, the data ETL 108 component may apply predefined database schemas to transform the raw data into structured governmental data elements, which may then be loaded into relational databases 116. As a result, data ETL 108 component may ensure that the data adheres to quality standards and may be formatted for efficient querying and retrieval. In some embodiments, this component may also interact with a data enrichment face and name recognition 110 component to further enhance the data with additional metadata.

In certain embodiments, the data enrichment face and name recognition 110 component may be configured to incorporate an additional layer of metadata into the processed data. In some embodiments, computer vision algorithms may be utilized to detect faces in video recordings and associate them with names and/or labels derived from the data sources 102. Additionally, in some embodiments, identifiers, such as (voice over) VO guide IDs, may be extracted to improve data accuracy and relevance. Consequently, the enriched data may be stored in vector databases 112, the graph databases 114, and the relational databases 116 to ensure that various database types benefit from the added metadata.

In some embodiments, the vector databases 112 may be arranged to manage unstructured data by converting text chunks into numeric vectors using embedding models. In some embodiments, these databases may be optimized for semantic search and/or relevance ranking so that the system may retrieve contextually similar data based on user queries. As a result, the vector databases 112 may interact with the semantic processing 104 component and a run semantic search and metadata filtering component 120 to ensure that the retrieved data aligns with the user's intent.

In some embodiments, the graph databases 114 may be configured to store the ontology generated by the graph extraction 106 component, wherein entities and their relationships may be represented in a graph format. In some embodiments, these databases may serve as the first step in query processing to extract metadata, thereby enriching user queries and optimizing SQL or vector database queries. Accordingly, the graph databases 114 may ensure consistency across the system by dynamically updating the ontology based on new legislative events.

In some embodiments, the relational databases 116 may be arranged to store structured data, such as tables of voting records or congressional staff directories, for example.

In some embodiments, these databases may interact with the data ETL 108 component and the graph databases 114 to ensure that structured data may be linked to the ontology and enriched with metadata. Accordingly, the relational databases 116 may be queried using SQL generated and optimized by downstream components.

In some embodiments, a user query 142 may represent the initial input from the user, which may include a query string and any additional parameters. In some embodiments, this component may interact with a routing agent 126 and semantic processing 124 to initiate the query processing workflow.

In some embodiments, the a "process query into chunks and apply NER, tagging, etc." 140 component may be arranged to break down the user query 142 into smaller segments for detailed analysis. In some embodiments, named entity recognition (NER) and tagging may be applied to identify entities and relationships that may be used to optimize query execution and response generation.

In some embodiments, the following are non-limiting examples of user queries and different types of user queries that align with the scope of the system that are shown herein for visual and conceptual clarity and not by way of limitation of the embodiments disclosed herein. The following exemplary queries may demonstrate the system's ability to manage structured, unstructured, and/or graph-based data while providing accurate, contextually relevant responses.

A first structured data query may include for example "Show me the latest vote in the House of Representatives." The system may then then retrieve voting records from relational databases, filtered by date to show the most recent vote. A second structured data query may include for example "Which Senator missed the most votes in the 118th Congress?" The system analyzes voting records to identify the Senator with the highest number of missed votes. A third structured data query may include for example "List all bills related to healthcare introduced in the Senate in the last month.". The system may then filter legislative records to provide a list of healthcare-related bills introduced within the specified timeframe.

In some embodiments, non-limiting examples of unstructured data queries may include a first exemplary query "What has Senator 1 said about national security on the Senate floor?" The system may then search unstructured speech transcripts stored in the 112 vector databases to find relevant mentions of "national security" by Senator 1. A second exemplary query "Provide a summary of the most recent congressional hearing on climate change." The system may retrieve and summarize unstructured data from hearing transcripts related to climate change.

In some embodiments, non-limiting examples of graph-based data queries may include a first exemplary query "Which members of Congress are cosponsors of the Green New Deal?" The system may uses the graph databases 114 to identify relationships between members of Congress and the Green New Deal bill. A second exemplary query may include "What committees are discussing tax reform this week?" The system may query the graph databases 114 to find committees associated with tax reform discussions based on recent metadata updates.

In some embodiments, non-limiting examples of complex queries where a first and second portion of the query may require structured data and unstructured data may include in a first exemplary query "What has Congress said about disaster relief funding for California in the last year?" The system may combine structured and unstructured data to retrieve voting records, legislative summaries, and speech transcripts related to disaster relief funding for California. A second exemplary query may include "Identify the top industries influencing Senator Schumer's voting pattern on taxes." The system may integrate lobbying disclosure data with voting records to analyze correlations between industries and voting patterns. A third exemplary query may include "Who worked for both Senator 1 and Senator 2?" The system may query congressional staff directories to identify individuals with employment histories in both offices.

In some embodiments, non-limiting examples of sentiment analysis queries may include in a first exemplary query "Analyze the sentiment of speeches by Senator 1 on immigration policy." The system may apply sentiment analysis to unstructured speech data to determine the tone and sentiment of Senator 1's statements on immigration. A second exemplary query may include "What is the overall sentiment of congressional discussions on renewable energy?" The system may aggregate sentiment analysis results from multiple speeches and hearings related to renewable energy.

In some embodiments, the routing agent 126 may be arranged as an LLM-based agent configured to determine the data type and semantic scope of the user query based on inputs from the "process query into chunks and apply NER, tagging, etc." 140 component. In some embodiments, upon such determination, the routing agent 126 may select appropriate agents from a pool of specialized agents, including structured data agents, unstructured data agents, and fallback agents. The selected agents may then modify and optimize the user query for execution in some embodiments.

In some embodiments, a plurality of specialized agents selected by the routing agent 126 may include but are not limited to at least one structured data agent, at least one unstructured data agent, at least one graph data agent, at least one semantic search agent, at least one validation agent, at least one bias mitigation agent, at least one fallback agent, or any combination thereof.

In some embodiments, the routing agent 126 may be configured to perform two decision steps as shown in FIG. 1. A first decision component referred to as a "Does user's query require structured data" decision component 130 may be assess when the user query, or portion of the user query, may need a structured data retrieval. In some embodiments, if structured data is required, the query may be routed to a convert text to Structured Query Language (SQL) 132 component for further processing.

In some embodiments, the convert text to SQL 132 component may be implemented to generate a number of SQL queries, such as for example, three queries for structured data retrieval. In some embodiments, this redundancy may ensure accuracy and reliability as the results may be evaluated for relevance and consistency. Accordingly, the SQL queries may be executed on the relational databases 116, and the resulting responses may be passed to the relevance evaluation components in some embodiments. Furthermore, generating at least three SQL queries may allow the system to compare the results of each query and identify inconsistencies or errors. This redundancy helps to detect and mitigate issues such as malformed queries, incomplete data retrieval, or database schema mismatches. Thus, if two or more queries return consistent results, the system may prioritize those results as reliable.

In some embodiments, if no structured data is required on a portion of the query in a second decision component referred to as a "Is user's query in scope" decision component 128 which may evaluate whether the user query falls within the system's capabilities.

In some embodiments, if the query is determined to be out of scope, a fallback 134 component may be triggered to provide alternative responses and/or suggestions, or to inform the user that the query may be out of scope.

In some embodiments, the fallback 134 component may be configured to manage queries that are out of scope or fail to produce satisfactory responses. In some embodiments, alternative processing techniques, such as semantic search or metadata filtering, may be employed by the fallback 134 component to provide an optimal response to the user. For example, the fallback 134 component may assess that the query "What is the weather forecast for Washington, D.C. next week?" is an out-of-scope query. The fallback 134 component may generate "The requested query is outside the scope of this system. Please try a query related to legislative or governmental data." Alternately, the fallback 134 component may recommend or suggest alternate queries such as for example, "What bills related to climate change were introduced in Congress last week?" or "What has Congress said about disaster relief funding for Washington, D.C.? "

In some embodiments, if the query is determined in the decision step 128 to be within scope, the semantic processing 124 component may be applied to the user query, where advanced NLP techniques may be employed to ensure accurate interpretation and alignment with the user's intent. In some embodiments, this component may interact with the routing agent 126 to determine a semantic scope of the query and select the appropriate processing agents, In some embodiments, an enrich user's query 122 component may be configured to modify the user query from the semantic processing 124 component by leveraging metadata extracted from the databases. In some embodiments, the semantic processing 124 component may generate enriched query strings and structured query formats to enhance the accuracy and relevance of query execution. Accordingly, metadata such as entity relationships, timestamps, and/or source identifiers may be used to filter results and optimize retrieval in some embodiments.

In some embodiments, the Run Semantic Search and Metadata Filtering 120 component may use the enriched query from the enriched user's query component 122 to ensure that unstructured data may be processed efficiently and that the retrieved results are both contextually relevant and precise. This step may be used for managing complex queries that require nuanced understanding and alignment with the user's intent. The run semantic search may use the vector databases 112 to perform semantic searches, which may identify and retrieve data that is contextually similar or relevant to the user query. Text chunks may be converted into numeric vectors using embedding models, enabling the system to find matches based on meaning rather than exact keywords, In some embodiments, the metadata filtering in the Run Semantic Search and Metadata Filtering 120 component may ensure that data aligned with the user's query intent and/or context may be retrieved, improving the accuracy and relevance of the results.

In some embodiments, a run query on database(s) 118 component may be configured to execute user queries across the heterogeneous databases including the graph databases 114, the vector databases 112, and/or the relational databases 116. In some embodiments, this component may leverage metadata extracted from the graph databases 114 to optimize query execution and ensure relevance. As a result, in some embodiments, processed queries both from the run semantic search and metadata filtering 120 and the convert text to SQL 132 component may be routed via the run query on database(s) 118 component to the appropriate database type based on data requirements and the semantic scope of the user query.

In some embodiments, an "evaluate the response for relevance to query" 146 component may be implemented to assess the retrieved data against the original user query. In some embodiments, this component may employ a relevance machine learning model trained on historical user queries and feedback to assign relevance scores to each response. The assigned scores may then be utilized to rank the responses, aiming to present the data that aligns most closely with the user's context in the original user query.

In some embodiments, a "choose the best response" 148 component may be configured to select the most relevant response from the ranked query responses. In some embodiments, the selection may be based on relevance scores, semantic similarity, and/or completeness, thereby ensuring that the user may receive accurate and/or contextually aligned data.

In some embodiments, a "convert response to narrative and table" 150 component may be implemented to format the selected response into user-friendly outputs, such as textual summaries, tables, or downloadable files. In some embodiments, the "convert response to narrative and table" 150 component may ensure that the response may be presented in a format aligned with the user's preferences and requirements.

In some embodiments, respond back to user 136 and 152 components may be arranged to deliver the formatted response to the user. In some embodiments, these components may ensure that the response may be both accessible and actionable, thereby providing the user with the insights and data required by the user query 142.

Figure 2:
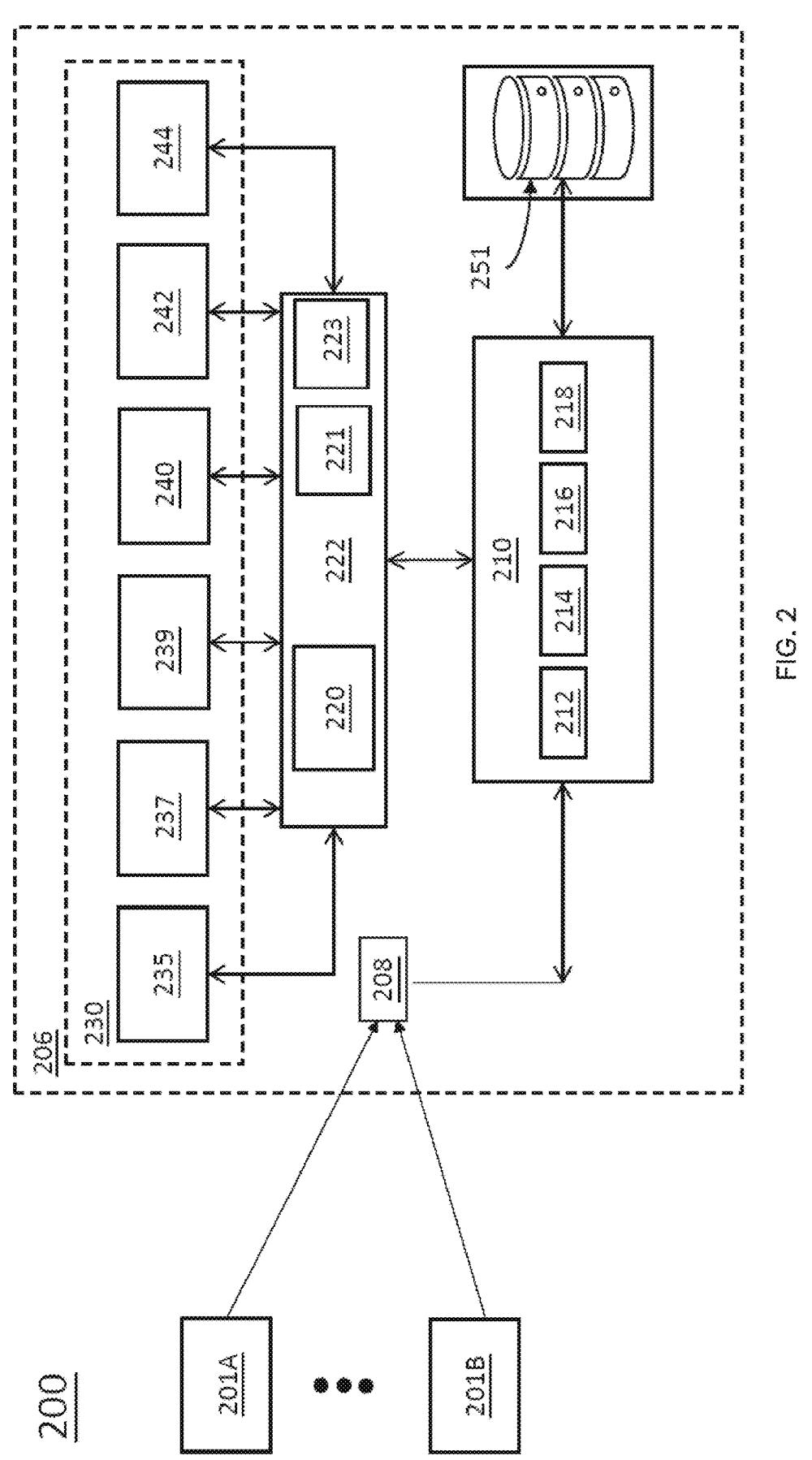
FIG. 2 is a block diagram illustrating an embodiment of a querying, processing, and ranking (QPR) system architecture for querying, processing, and ranking governmental data across heterogeneous databases in accordance with one or more embodiments of the present disclosure.

FIG. 2 is a block diagram of a first embodiment of a QPR system 200 of governmental data across heterogeneous databases implemented by a QPR microservices platform 206 in accordance with one or more embodiments of the present disclosure. Aspects of the present disclosure may be applied to any embodiment for the microservices platform 206 that may include software modules denoted 235, 237, 239, 240 and 244 for implementing the QPR platform microservices in a service layer 230 as described hereinbelow.

In some embodiments, the QPR microservices platform 206 may include a multi-layered architecture including, for example, the service layer 230, an orchestration layer 222, and a platform layer 210, however other layers may be additionally contemplated. In some embodiments, a plurality of data sources may interact with the QPR microservices platform 206 via any of N source devices denoted 201A . . . 201B, where N may be an integer. Communications from the source devices 201A . . . 201B may be received by a communication circuitry 208 and may then be routed to an appropriate component of the system, via the platform layer 210, for example.

In some embodiments, the platform layer 210 may include an input/output (I/O) interface 212 for facilitating data communication to external devices, such as, e.g., the communication circuitry 208 with any other system devices. The platform layer 210 may also include a runtime environment 214 for implementing programs, services, functionalities and microservices using a plurality of processors 216 and memory devices 218 in a plurality of computing machines such as the M computing machines for implementing the QPR microservices platform 206. The memory devices 218 may include, e.g., temporary storage and caching of data to facilitate resources of the QPR microservices platform 206.

In some embodiments, the orchestrator 220 may manage operations of the QPR microservices platform 206, including allocation of resources (e.g., add or removing any number of the computing machines) by a load balancer 223, process schedule with, e.g., the plurality of processors 216, among other tasks. For example, in some embodiments, the orchestrator 220 may include a plurality of application programming interfaces (APIs) 221 for calling services and functions of the QPR microservices platform 206 in interacting with the source devices 201A 201B.

In some embodiments, the orchestrator 220 may manage operations of microservices in a service layer 230 and coordination of the service layer 230 with the platform layer 210.

In some embodiments, the database 251 as described above may be separate from databases stored in the plurality of memories stored in the plurality of computing machines.

In some embodiments, any data stored the plurality of databases may be accessible from the N source devices 201A . . . 201B via any of the plurality of APIs 221 in the orchestration layer 222 in the QPR microservices platform 606.

In some embodiments, the software modules 235, 237, 239, 240, 242, and 244 in FIG. 2 correspond to specific functionalities within the QPR System (Querying, Processing, and Ranking System) and may be directly related to the components of FIG. 1. These modules are implemented within the Service Layer (230) of the system architecture and interact with the Runtime Environment (214) in the Platform Layer (210) to execute the processes described in FIG. 1.

In some embodiments, a database population module 235 may be used for iteratively populating vector, relational, and/or graph databases with governmental data elements. This module may interact with components such as the data sources 102, the data ETL 108 component, the graph extraction 106 component, and the data enrichment faces and name recognition 110 to ensure that raw data may be transformed, enriched, and/or stored in the appropriate database formats.

In some embodiments, a user query processing module 237 may manage the initial processing of user queries by breaking them into smaller segments, applying named entity recognition (NER), tagging, and/or semantic analysis to optimize query execution. This module may be closely related to components such as process query into chunks and apply NER, tagging, etc. 140 component, the semantic processing 124 component, and the enrich user's query 122 component, which may collectively ensure accurate interpretation and modification of user queries.

In some embodiments, a query routing agent module 239 may implement the routing agent functionality, determining the data type and/or semantic scope of the user query and/or selecting appropriate specialized agents for query processing. This module may interact with components such as the routing agent 126, the "Is user's query in scope" decision component 128, and the "Does user's query require structured data" decision component 130 to route queries based on their scope and data requirements.

In some embodiments, a specialized query processing agents module 240 manages the execution of various specialized agents, including structured data agents, unstructured data agents, graph data agents, semantic search agents, validation agents, bias mitigation agents, and/or fallback agents. This module may be related to components such as the routing agent 126, the convert text to SQL 132, the run semantic search and metadata filtering 120, and/or the fallback 134 components, which ensure that queries may be processed by the most suitable agents based on their context and requirements.

In some embodiments, a relevance scoring algorithms and/or machine learning model (MLM) module 242 may evaluate the relevance of query responses using a machine learning model trained on historical user queries and feedback. This module may interact with components such as "evaluate the response for relevance to query" 146 component and the "choose the best response" 148 component to assign relevance scores and rank responses based on their alignment with the original user query.

Finally, in some embodiments, a graphic user interface (GUI) module 244 may control a display for formatting and delivering the ranked query responses to the user in user-friendly outputs, such as textual summaries, tables, and/or downloadable files. This module may be related to components such as the "convert response to narrative and table" 150 component and the respond back to user 136 and 152 components, which may ensure that the responses may be presented in a format aligned with the user's preferences and/or requirements. Together, these software modules and components form a cohesive system for querying, processing, and ranking governmental data across heterogeneous databases, leveraging the computational infrastructure provided by the Runtime Environment (214) to ensure efficient execution of processes.

Figure 3A:
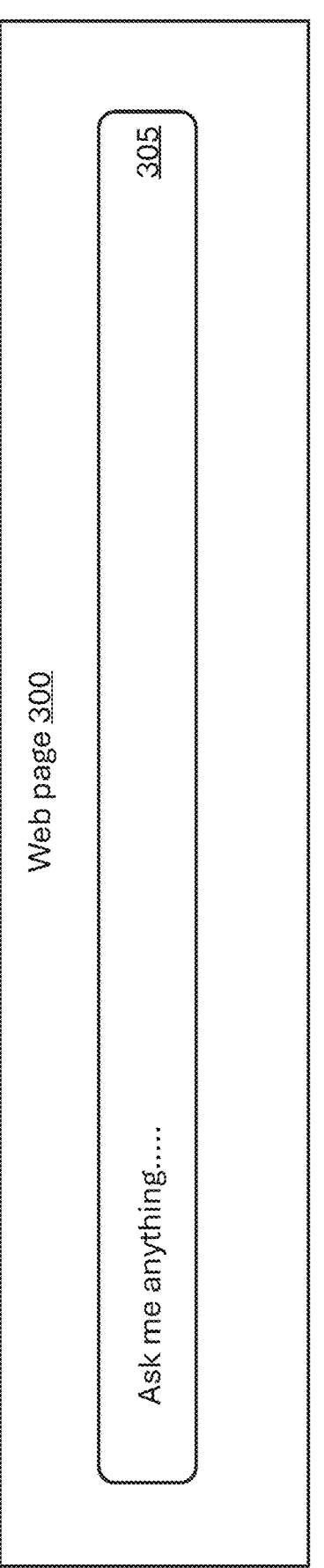
FIG. 3A illustrates a graphical user interface (GUI) of a web page featuring a search field for inputting user queries in accordance with one or more embodiments of the present disclosure.

FIG. 3A is a graphic user interface (GUI) screenshot of a web page interface 300 in accordance with one or more embodiments of the present disclosure. The interface may include a search field 305 where users may input user queries (e.g., the user query 142) interact with the system. This search field may serve as the entry point for querying governmental data across heterogeneous databases, allowing users to submit queries intuitively without requiring technical expertise. For example, users may enter queries such as, "What has Congress said about renewable energy in the last year?" or "Show me the latest vote in the House of Representatives." Upon submission, the system may capture the query string and initiates the query processing workflow as shown in FIG. 1, leveraging components such as the routing agent 126 and specialized agents to determine the data type, semantic scope, and appropriate processing path. FIG. 3A illustrates the simplicity and accessibility of the user interface, which is designed to facilitate seamless interaction with the system while ensuring accurate and contextually relevant responses.

Figure 3B:
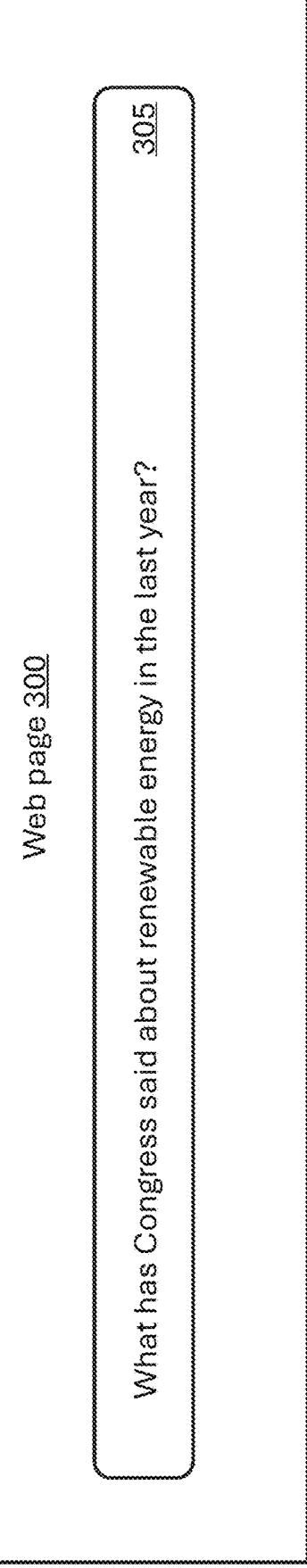
FIG. 3B is a graphical user interface screenshot illustrating a web page with a search field for entering a natural language query in accordance with one or more embodiments of the present disclosure.

FIG. 3B is a GUI screenshot of the same web page interface 300 in accordance with one or more embodiments of the present disclosure, showing an example user query entered into the search field 305. The exemplary user query may be entered into the search field 305 "What has Congress said about renewable energy in the last year?" Upon receiving the query, the system may process it using the routing agent 126 to determine the data type and semantic scope. The query may then be enriched by leveraging metadata extracted from the graph database 114 and modified by specialized agents, such as the semantic search agent or structured data agent, depending on the query's requirements.

FIG. 3C is a GUI screenshot of the web page interface 300 in accordance with one or more embodiments of the present disclosure, displaying ranked query responses 310 generated by the system based on the user query entered in FIG. 3B. The responses may be presented in a user-friendly format, with each response accompanied by a relevance score to indicate its alignment with the original query. For example, the ranked responses may include: "A congressional report published on May 5, 2023, highlighted the economic benefits of renewable energy investments, including job creation in the wind and solar sectors." (Relevance Score: 0.95), followed by other relevant responses ranked in descending order of relevance. The ranked responses are generated by the relevance machine learning model (242), which evaluates the responses based on their contextual alignment with the user query. FIG. 3C illustrates the system's ability to deliver accurate, contextually relevant, and prioritized results, enhancing the user experience and ensuring the utility of the system for governmental data analysis.

FIG. 4 is a flowchart of a method 350 for querying, processing, and ranking governmental data across heterogeneous databases in accordance with one or more embodiments of the present disclosure. The method 350 may be performed by any of the plurality of processors 216.

The method 350 may include iteratively populating 355, by at least one processor, at least one database with a plurality of governmental data elements by: obtaining source data from a plurality of governmental data sources at predefined times, iteratively transforming the source data to the plurality of governmental data elements using at least one database schema, and iteratively populating the at least one database with the plurality of governmental data elements based on the at least one database schema, wherein the at least one database is at least one of: at least one vector database having at least one vector database schema, at least one relational database having at least one relational database schema, or at least one graph database having at least one graph database schema.

The method 350 may include receiving 360, by the at least one processor, at least one user query from a user, comprising at least one query string, to obtain at least one query-related governmental data element from the plurality of governmental data elements stored in the at least one database.

The method 350 may include performing 365, by the at least one processor, using at least one routing agent: a determination of a data type, a semantic scope, or both, of the at least one query string and a selection of at least one selected agent from a plurality of agents, based on the determination, to further modify the at least one user query, wherein the plurality of agents comprises: at least one structured data agent, at least one unstructured data agent, at least one graph data agent, at least one semantic search agent, at least one validation agent, at least one bias mitigation agent, or at least one fallback agent.

The method 350 may include executing 370, by the at least one processor, the at least one selected agent to modify the at least one user query by: obtaining at least one metadata from the at least one database, modifying the at least one query string based at least in part the at least one metadata to obtain a plurality of modified query strings.

The method 350 may include when a first portion of at least one first modified query string of the plurality of modified query strings requires at least one first response comprising structured data 375: converting, by the at least one processor, the first portion of the at least one first modified query string to at least one structured data format-based query string and querying, by the at least one processor, the at least one database with the at least one structured data format-based query string to receive the at least one first response.

The method 350 may include when a second portion of at least one second modified query string of the plurality of modified query strings requires at least one second response comprising unstructured data 380: applying, by the at least one processor, at least one natural language processing (NLP) model, at least one trained machine learning model, or any combination thereof to the second portion of the at least one second modified query string to generate at least one enriched query string, filtering, by the at least one processor, the at least one enriched query string using the at least one metadata; and querying, by the at least one processor, the at least one database with the at least one enriched query string to obtain the at least one second response.

The method 350 may include receiving 385, by the at least one processor, a plurality of query responses to the at least one structured data format-based query string, the at least one enriched query string, or any combination thereof, wherein the plurality of query responses comprises the at least one first response, the at least one second response, or any combination thereof.

The method 350 may include inputting 390, by the at least one processor, the plurality of query responses into at least one relevance machine learning model that is trained to: determine a relevance score for each query response from the plurality of query responses, and rank each query response based on the relevance score to generate a plurality of ranked query responses, wherein the relevance score is a comparison between a particular query response of the plurality of query responses and the at least one user query.

The method 350 may include outputting 395, by the at least one processor, the plurality of ranked query responses to the user, In some embodiments with regard to step 370, hereinbelow are a few non-limiting examples illustrating how at least one selected agent may modify a user query to generate a plurality of modified query strings. These non-limiting examples are presented merely for conceptual and visual clarity and now by way of any limitations of the embodiments disclosed herein.

In some embodiments, a selected structured data agent may be used to modify the user query string "Show me the latest vote in the House of Representatives". The structured data agent may use metadata such as timestamps, entity relationships, and/or source identifiers to enrich the query and generate multiple SQL-based query strings using components 140 and 132 in FIG. 1. Exemplary modified query strings may include:

1. SELECT*FROM VotingRecords WHERE Chamber= 'House' ORDER BY VoteDate DESC LIMIT 1;

2. SELECT VoteID, BillName, Result FROM VotingRecords WHERE Chamber= 'House' AND VoteDate= (SELECT MAX (VoteDate) FROM VotingRecords WHERE Chamber='House');

3. SELECT*FROM VotingRecords WHERE Chamber= 'House' AND VoteDate>=CURRENT_DATE-INTERVAL '7 DAYS' ORDER BY VoteDate DESC;

In some embodiments, a selected unstructured data agent may be used to modify the user query string "What has Senator 1 said about healthcare on the Senate floor?". The unstructured data agent may applies natural language processing (NLP) and metadata filtering to enrich the query, focusing on keywords, speaker names, and relevant timeframes. Exemplary modified query strings may include:

1. "Find all speech transcripts where 'Name of Senator 1' mentions 'healthcare'."

2. "Retrieve text chunks from vector databases where embeddings match 'Name of Senator 1' and 'healthcare' with a similarity score above 0.8."

3. "Search unstructured data for speeches by 'Name of Senator 1' containing the term 'healthcare' within the last 12 months."

In some embodiments, a selected graph data agent may be used to modify the user query string "Which members of Congress are cosponsors of the Green New Deal?" The unstructured data agent may use the graph database to identify relationships between entities (e.g., members of Congress and the Green New Deal bill) and enriches the query with metadata such as bill identifiers and cosponsorship relationships. Exemplary modified query strings may include:

1. MATCH (m: Member)-[: COSPONSOR]→(b: Bill {Name: 'Green New Deal'}) RETURN m;

2. MATCH (m: Member)-[: COSPONSOR]→(b: Bill) WHERE b.BillID='HR109' RETURN m.Name, m.Party;

3. MATCH (m: Member)-[: COSPONSOR]→(b: Bill) WHERE b.Name CONTAINS 'Green New Deal' RETURN DISTINCT m.Name;

In some embodiments, a selected semantic search agent may be used to modify the user query string "Provide a summary of the most recent congressional hearing on climate change." The unstructured data agent may use the graph database to identify relationships between entities (e.g., members of Congress and the Green New Deal bill) and enriches the query with metadata such as bill identifiers and cosponsorship relationships. Exemplary modified query strings may include:

1. "Retrieve hearing transcripts where embeddings match 'climate change' and 'hearing' with a similarity score above 0.85."

2. "Search vector databases for the most recent hearing mentioning 'climate change' and summarize the results."

3. "Filter hearing transcripts by date and topic to find the latest discussion on 'climate change'."

In some embodiments, a selected bias mitigation agent may be used to modify the user query string "What has Congress said about renewable energy in the last year?" The bias mitigation agent may cross-verify data sources and may apply metadata filters to ensure unbiased and accurate query results. Exemplary modified query strings may include:

1. "Retrieve speech transcripts and voting records mentioning 'renewable energy' from congress.gov and regulations.gov."

2. "Filter results by source reliability and exclude data with incomplete metadata for 'renewable energy'."

3. "Search for legislative summaries and speeches on 'renewable energy' while prioritizing authoritative sources."

Note that the purpose of generating multiple modified query strings is for improved accuracy such that the system ensures that the most relevant and accurate data is retrieved, for error mitigation such that multiple query strings may allow for cross-validation of results, reducing the likelihood of errors or incomplete responses, and for contextual relevance by enriching the query with metadata to ensure that the retrieved data aligns closely with the user's intent. These above exemplary examples demonstrate how specialized agents may modify user queries to generate a plurality of enriched query strings, ensuring precise and/or contextually relevant responses.

In some embodiments with regard to the user query 142 requiring structured data, the convert text to SQL 132 component (e.g., the structured data agent) may be used to convert the user query to multiple SQL queries. As a non-limiting example for visual and conceptual clarity, the user query may be "Show me all healthcare-related bills introduced in the Senate in the last month." The Structured Data Agent may process the user query and may generate the following three exemplary SQL queries to ensure accuracy, reliability, and/or comprehensive retrieval of structured data from relational databases.

SQL Query 1:

Retrieve all bills with the keyword "healthcare" introduced in the Senate within the last month. sql SELECT BillID, BillName, IntroductionDate, Sponsor FROM Bills WHERE Chamber= 'Senate' AND IntroductionDate>=CURRENT_DATE-INTERVAL '1 MONTH' AND BillName LIKE '% healthcare %';

SQL Query 2:

Filter bills by topic metadata (e.g., "healthcare") stored in a separate column and limit results to the Senate.

sql SELECT BillID, BillName, IntroductionDate, Sponsor FROM Bills WHERE Chamber= 'Senate' AND IntroductionDate BETWEEN DATE_SUB (CURRENT_DATE, INTERVAL 1 MONTH) AND CURRENT_DATE AND Topic= 'healthcare';

SQL Query 3:

Retrieve bills introduced in the Senate within the last month and cross-reference with a "Tags" table for healthcare-related keywords.

sql SELECT b.BillID, b.BillName, b. IntroductionDate, b.Sponsor FROM Bills b JOIN Tags t ON b.BillID=t.BillID WHERE b.Chamber= 'Senate' AND b. IntroductionDate>=CURRENT_DATE-INTERVAL '1 MONTH' AND t. Tag= 'healthcare';

In some embodiments, the system workflow may include the Routing Agent 126 may determine that the query requires structured data. The Convert Text to SQL 132 component may generate the multiple SQL queries based on metadata extracted from the graph database 114. The results may be evaluated for relevance and consistency by the Evaluate the Response for Relevance to Query 146 component. The most relevant response may be selected by the Choose the Best Response 148 component and formatted for the user.

In some embodiments, the user query requiring unstructured data may be converted to an enriched query string. Consider the exemplary query string "What has Senator 1 said about climate change on the Senate floor?" The Unstructured Data Agent may processes the exemplary user query and may enrich it using metadata extracted from the graph database 114 (e.g., entity relationships, timestamps, and source identifiers) and natural language processing (NLP) techniques. An exemplary flow illustrating how the query may be enriched may include the following flow:

Step 1: Extract Metadata

Speaker: Senator 1

Topic: Climate Change

Location: Senate Floor

Timeframe: Relevant recent speeches (e.g., last 12 months)

Source: Congressional speech transcripts stored in vector databases

Step 2: Generate Enriched Query String

The enriched query string incorporates the extracted metadata to improve the precision and relevance of the search.

Enriched Query String:

"Retrieve all speech transcripts where 'Senator 1' is the speaker, the topic is 'climate change,' the location is 'Senate floor,' and the speech occurred within the last 12 months."

Step 3: Semantic Search Representation

The enriched query string is further processed into a semantic search format for vector databases:

1. Embedding-Based Search:

Convert the enriched query into a vector embedding using an NLP model.

Search for text chunks in the vector database with a high similarity score to the embedding.

2. Filter Using Metadata:

Apply filters to ensure results match the metadata criteria:

Speaker: Name of Senator 1

Topic: Climate Change

Location: Senate Floor

Timeframe: Last 12 months

Vector Database Query:

Embedding Search:

Retrieve text chunks with embeddings similar to:

"Name of Senator 1+Climate Change+Senate Floor+ Last 12 Months"

Metadata Filtering:

Filter results by:

Speaker= 'Name of Senator 1'

Topic= 'Climate Change'

Location= 'Senate Floor'

Date>=CURRENT_DATE-INTERVAL '12 MONTHS'

In this case, the system workflow may include the Routing Agent 126 determining that the query involves unstructured data. The Unstructured Data Agent may enrich the query using metadata from the graph database 114. The Run Semantic Search and Metadata Filtering 120 component executes the enriched query on the vector database 112. The results may be evaluated for relevance by the Evaluate the Response for Relevance to Query 146 component and may be presented to the user.

Figure 5:
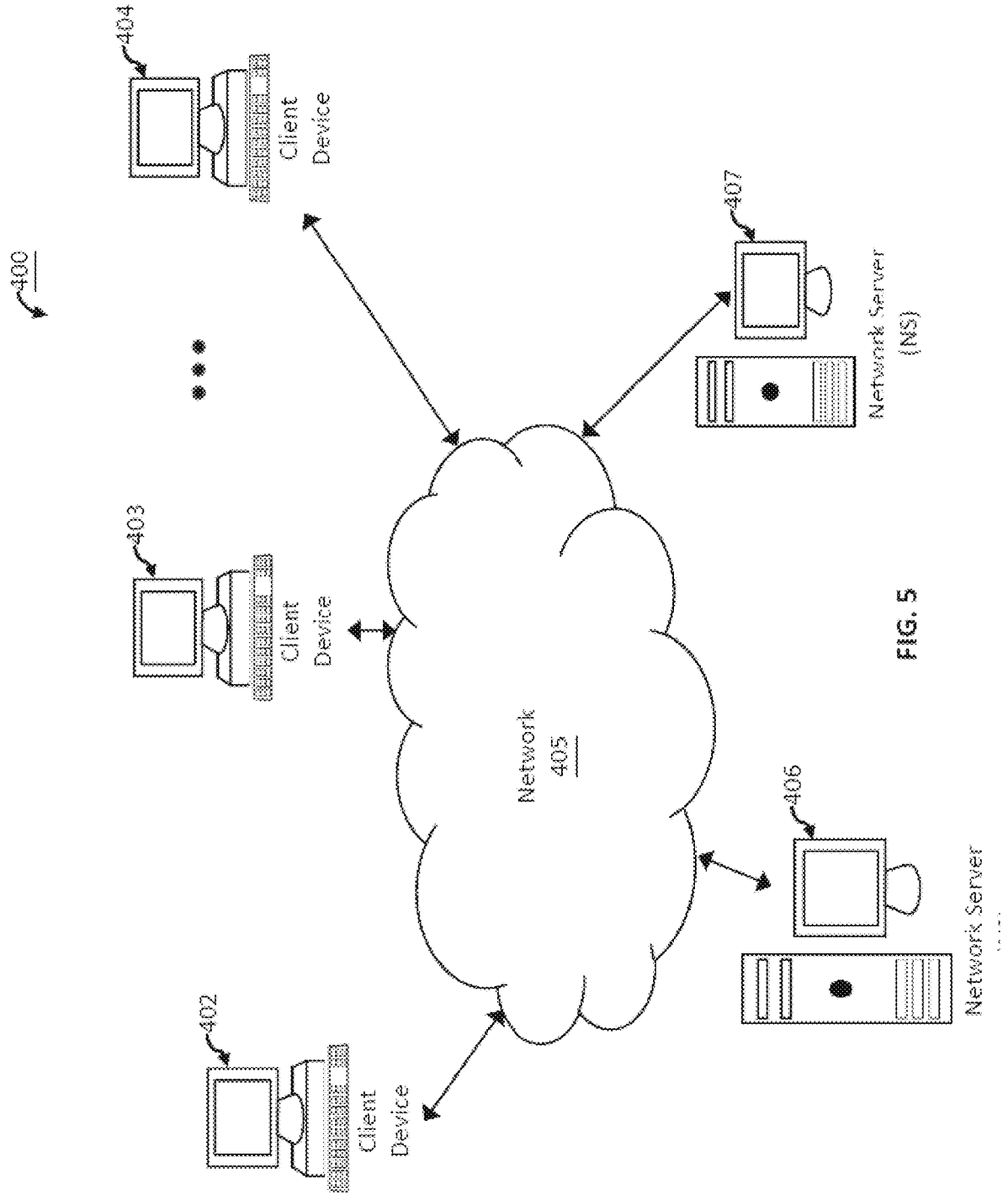
FIG. 5 depicts a block diagram of an exemplary computer-based system/platform in accordance with one or more embodiments of the present disclosure.

FIG. 5 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured for querying, processing, and ranking governmental data across heterogeneous databases, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, source devices 402-404 (e.g., client devices) of the exemplary computer-based system/platform 400 may include virtually any computing device capable of receiving and sending a message over a network (e.g., cloud network), such as network 405, to and from another computing device, such as servers 406 and 407, each other, and the like. Here, source devices 402-404 may be the plurality of N source data devices 305A . . . 305N. In some embodiments, the source devices 402-404 may be personal computers, multiprocessor systems, microprocessor-based or programmable consumer electronics, network PCs, and the like.

In some embodiments, one or more source devices within source devices 402-404 may include computing devices that typically connect using a wireless communications medium such as vehicles, vehicle sensors, cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more source devices within source devices 402-404 may be devices that are capable of connecting using a wired or wireless communication medium such as a PDA, POCKET PC, wearable computer, a laptop, tablet, desktop computer, a netbook, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.).

In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a source device within source devices 402-404 may be specifically programmed by either Java, .Net, QT, C, C++ and/or other suitable programming language.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE).

In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof.

In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing servers, advertisement providing servers, financial/banking-related services servers, travel services servers, or any similarly suitable service-base servers for users of the source devices 402-404.

In some embodiments and, optionally, in combination of any embodiment described above or below, for example, one or more exemplary source devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
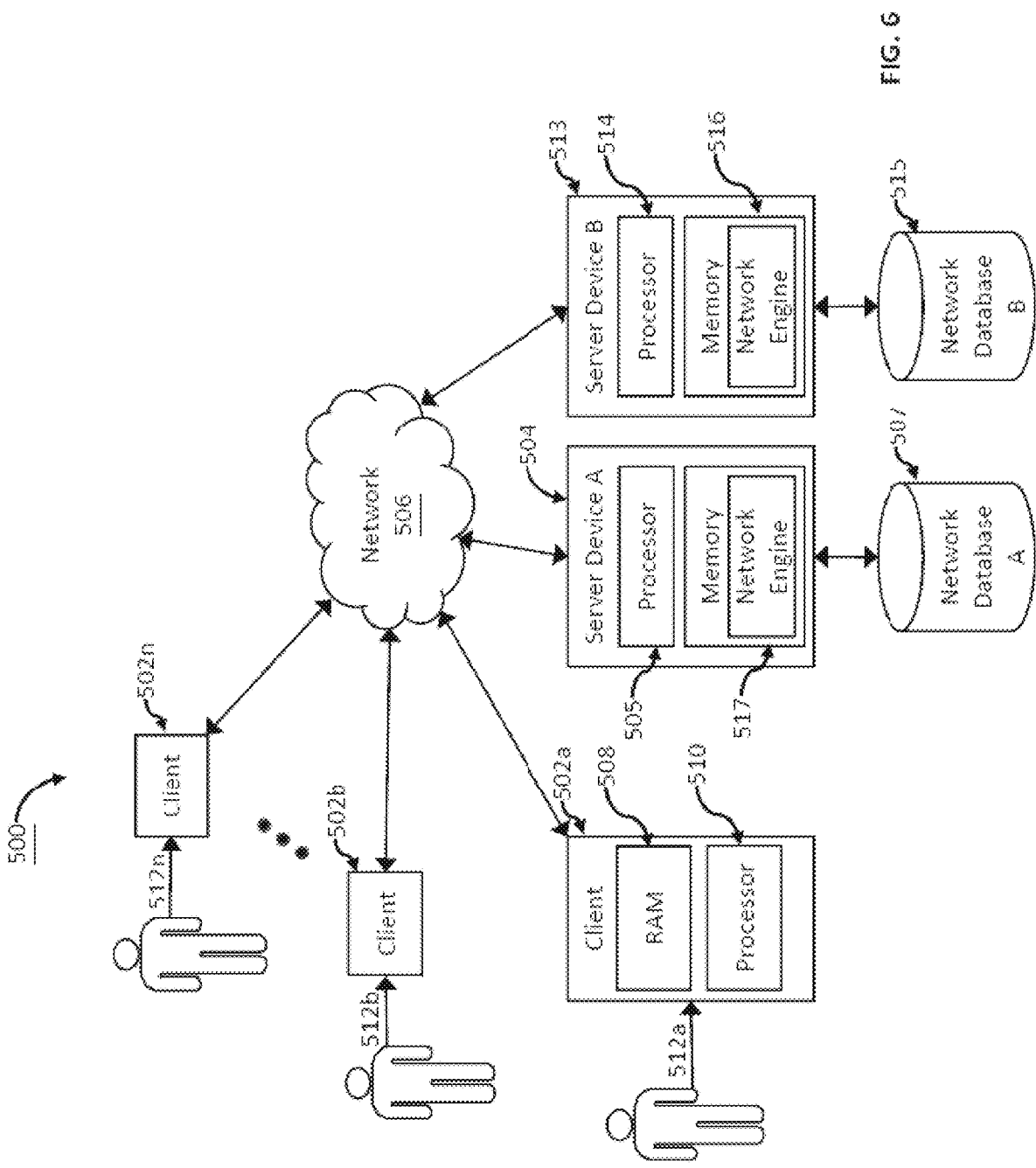
FIG. 6 depicts a block b diagram of another exemplary computer-based system/platform in accordance with one or more embodiments of the present disclosure.

FIG. 6 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the source computing devices 502a, 502b thru 502n shown each at least includes a computer-readable medium, such as a random-access memory (RAM) 508 coupled to a processor 510 or FLASH memory. Here, source (e.g., client) devices 502a, 502b thru 502n may be the plurality of N source data devices 305A . . . 305N.

In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, source computing devices 502a through 502n may also comprise a number of external or internal devices such as a mouse, a CD-ROM, DVD, a physical or virtual keyboard, a display, a speaker, or other input or output devices. In some embodiments, examples of source computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices.

In some embodiments, source computing devices 502a through 502n may be specifically programmed with one or more application programs in accordance with one or more principles/methodologies detailed herein. In some embodiments, source computing devices 502a through 502n may operate on any operating system capable of supporting a browser or browser-enabled application, such as Microsoft™, Windows™, and/or Linux. In some embodiments, source computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the source computing client devices 502a through 502n, may communicate over the exemplary network 506 with each other and/or with other systems and/or devices coupled to the network 506. As shown in FIG. 6, exemplary server devices 504 and 513 may be also coupled to the network 506. In some embodiments, one or more source computing devices 502a through 502n may be mobile clients.

In some embodiments, at least one database of exemplary databases 507 and 515 may be any type of database, such as the database 362 described above, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
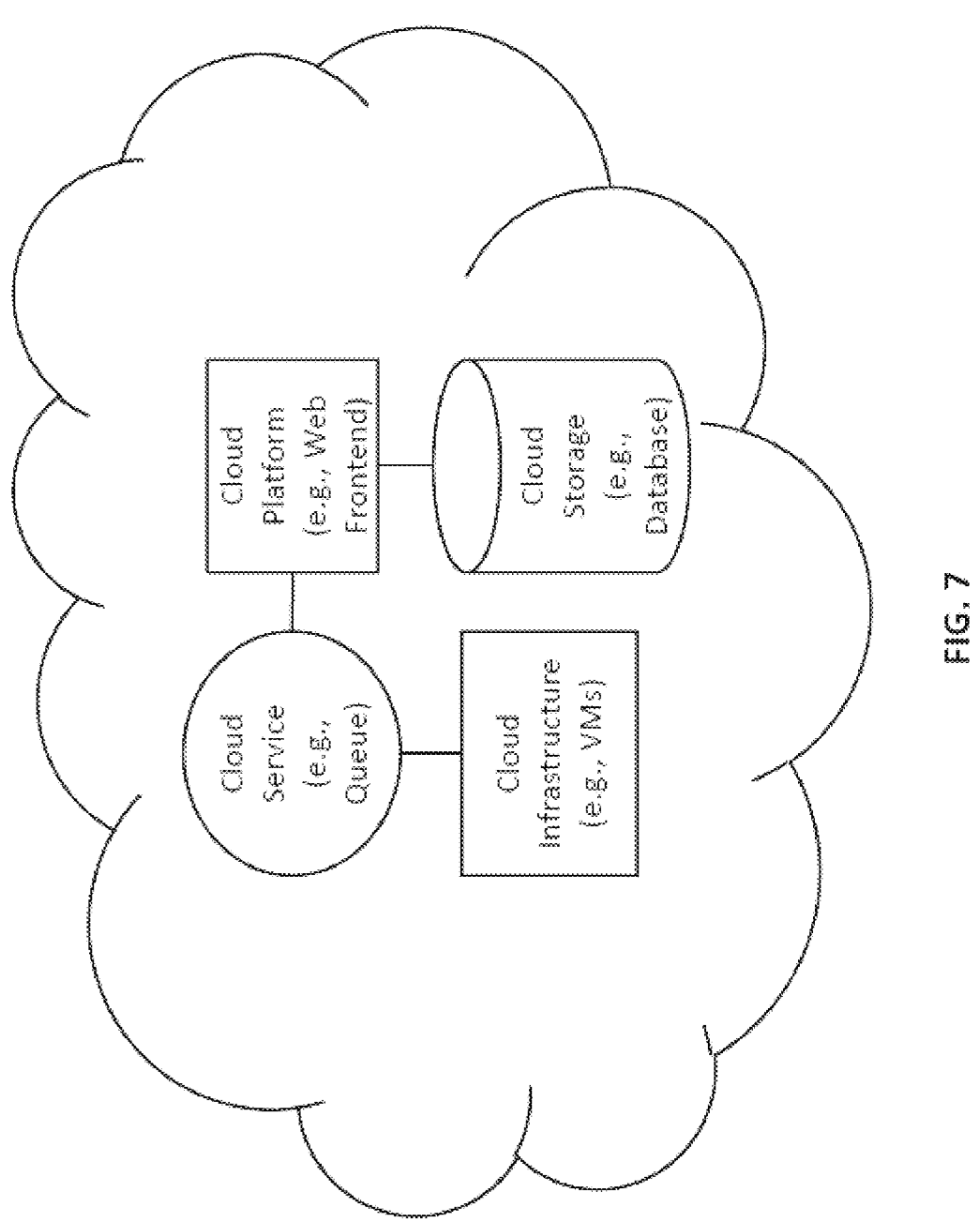
FIGS. 7 and 8 are diagrams illustrating implementations of cloud computing architecture/aspects with respect to which the disclosed technology may be specifically configured to operate, in accordance with one or more embodiments of the present disclosure.
Figure 8:
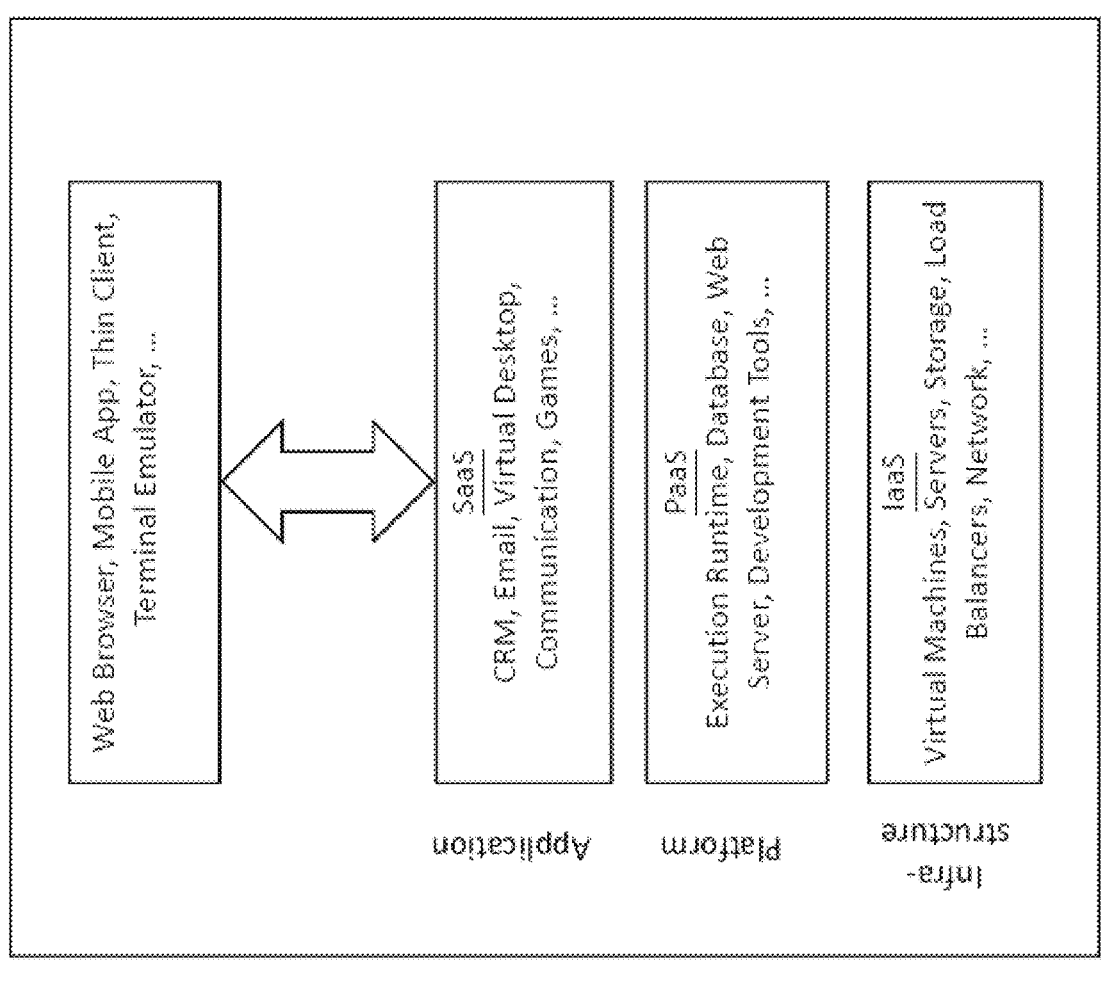

In some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS). FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, a method may include iteratively populating, by at least one processor, at least one database with a plurality of governmental data elements by: obtaining source data from a plurality of governmental data sources at predefined times, iteratively transforming the source data to the plurality of governmental data elements using at least one database schema, and iteratively populating the at least one database with the plurality of governmental data elements based on the at least one database schema. The at least one database is at least one of: at least one vector database having at least one vector database schema, at least one relational database having at least one relational database schema, or at least one graph database having at least one graph database schema. The at least one processor may receive at least one user query from a user that may include at least one query string, to obtain at least one query-related governmental data element from the plurality of governmental data elements stored in the at least one database. The at least one processor may perform using at least one routing agent: a determination of a data type, a semantic scope, or both, of the at least one query string and a selection of at least one selected agent from a plurality of agents, based on the determination, to further modify the at least one user query. The plurality of agents may include: at least one structured data agent, at least one unstructured data agent, at least one graph data agent, at least one semantic search agent, at least one validation agent, at least one bias mitigation agent, or at least one fallback agent. The at least one processor may execute the at least one selected agent to modify the at least one user query by: obtaining at least one metadata from the at least one database, and modifying the at least one query string based at least in part the at least one metadata to obtain a plurality of modified query strings. When a first portion of at least one first modified query string of the plurality of modified query strings requires at least one first response comprising structured data, the at least one processor may convert the first portion of the at least one first modified query string to at least one structured data format-based query string and may query the at least one database with the at least one structured data format-based query string to receive the at least one first response. When a second portion of at least one second modified query string of the plurality of modified query strings requires at least one second response comprising unstructured data: the at least one processor may apply at least one natural language processing (NLP) model, at least one trained machine learning model, or any combination thereof to the second portion of the at least one second modified query string to generate at least one enriched query string, may filter the at least one enriched query string using the at least one metadata, and may query the at least one database with the at least one enriched query string to obtain the at least one second response. The at least one processor may receive a plurality of query responses to the at least one structured data format-based query string, the at least one enriched query string, or any combination thereof. The plurality of query responses may include the at least one first response, the at least one second response, or any combination thereof. The at least one processor may input the plurality of query responses into at least one relevance machine learning model that is trained to: determine a relevance score for each query response from the plurality of query responses, and rank each query response based on the relevance score to generate a plurality of ranked query responses. The relevance score may be a comparison between a particular query response of the plurality of query responses and the at least one user query. The at least one processor may output the plurality of ranked query responses to the user.

In some embodiments, the at least one relevance machine learning model may be trained using historical user queries, feedback, or both.

In some embodiments, the at least one metadata may include at least one of: entity relationships, timestamps, source identifiers, or any combination thereof.

In some embodiments, the plurality of query responses may include at least one of: textual summaries, tables, downloadable files, or any combination thereof.

In some embodiments, the at least one routing agent may include a large language learning model (LLM)-based agent configured to concurrently select and execute at least two agents from the plurality of agents based on the determination of the data type, the semantic scope, or both, of the at least one query string.

In some embodiments, the method may further include iteratively updating the at least one database in real time by incorporating additional governmental data elements obtained from the plurality of governmental data sources at the predefined times.

In some embodiments, modifying the at least one query string may include generating the plurality of modified query strings, each formatted for execution as either a structured data format-based query string or an enriched query string for unstructured data retrieval.

In some embodiments, filtering the at least one enriched query string using the at least one metadata may include applying a threshold criterion to exclude modified query strings corresponding to metadata that do not meet predetermined data quality standards.

In some embodiments, querying the at least one database with the at least one structured data format-based query string may include generating a plurality of SQL queries and selecting at least one SQL query based on an accuracy evaluation in retrieving relevant structured data.

In some embodiments, the method may further include concurrently inputting the plurality of query responses into the at least one relevance machine learning model to expedite a generation of the plurality of ranked query responses.

In some embodiments, the plurality of agents may include agents specialized for processing data the at least one vector database, the at least one relational database, the at least one graph database, or any combination thereof; and wherein the selection of the at least one selected agent is based on the data type stored in the at least one database.

In some embodiments, the method may further include using a consensus-based validation mechanism where multiple agents independently verify an accuracy and a relevance of the plurality of query responses prior to their ranking by the at least one relevance machine learning model.

In some embodiments, a system may include at least one memory for storing instructions; and at least one processor in communication with the at least one memory. The at least one processor may be configured to execute the instructions to iteratively populate at least one database with a plurality of governmental data elements by: obtaining source data from a plurality of governmental data sources at predefined times, iteratively transforming the source data to the plurality of governmental data elements using at least one database schema, and iteratively populating the at least one database with the plurality of governmental data elements based on the at least one database schema; where the at least one database may be at least one of: at least one vector database having at least one vector database schema, at least one relational database having at least one relational database schema, or at least one graph database having at least one graph database schema, to receive at least one user query from a user, comprising at least one query string, to obtain at least one query-related governmental data element from the plurality of governmental data elements stored in the at least one database, to perform using at least one routing agent: a determination of a data type, a semantic scope, or both, of the at least one query string and a selection of at least one selected agent from a plurality of agents, based on the determination, to further modify the at least one user query; where the plurality of agents may include: at least one structured data agent, at least one unstructured data agent, at least one graph data agent, at least one semantic search agent, at least one validation agent, at least one bias mitigation agent, or at least one fallback agent; to execute the at least one selected agent to modify the at least one user query by: obtaining at least one metadata from the at least one database, and modifying the at least one query string based at least in part the at least one metadata to obtain a plurality of modified query strings. When a first portion of at least one first modified query string of the plurality of modified query strings requires at least one first response comprising structured data, the at least one processor may be configured to convert the first portion of the at least one first modified query string to at least one structured data format-based query string and query the at least one database with the at least one structured data format-based query string to receive the at least one first response. When a second portion of at least one second modified query string of the plurality of modified query strings requires at least one second response may include unstructured data, the at least one processor may be configured to apply at least one natural language processing (NLP) model, at least one trained machine learning model, or any combination thereof to the second portion of the at least one second modified query string to generate at least one enriched query string; filter the at least one enriched query string using the at least one metadata; and query the at least one database with the at least one enriched query string to obtain the at least one second response. The at least one processor may be configured to receive a plurality of query responses to the at least one structured data format-based query string, the at least one enriched query string, or any combination thereof; where the plurality of query responses may include the at least one first response, the at least one second response, or any combination thereof, to input the plurality of query responses into at least one relevance machine learning model that is trained to: determine a relevance score for each query response from the plurality of query responses, and rank each query response based on the relevance score to generate a plurality of ranked query responses; where the relevance score may be a comparison between a particular query response of the plurality of query responses and the at least one user query; and to output the plurality of ranked query responses to the user.

In some embodiments, the at least one relevance machine learning model may be trained using historical user queries, feedback, or both.

In some embodiments, the at least one metadata may include at least one of: entity relationships, timestamps, source identifiers, or any combination thereof.

In some embodiments, the plurality of query responses may include at least one of: textual summaries, tables, downloadable files, or any combination thereof.

In some embodiments, the at least one routing agent may include a large language learning model (LLM)-based agent configured to concurrently select and execute at least two agents from the plurality of agents based on the determination of the data type, the semantic scope, or both, of the at least one query string.

In some embodiments, the at least one processor may be configured to iteratively update the at least one database in real time by incorporating additional governmental data elements obtained from the plurality of governmental data sources at the predefined times.

In some embodiments, the at least one processor may be configured to modify the at least one query string by generating the plurality of modified query strings, each formatted for execution as either a structured data format-based query string or an enriched query string for unstructured data retrieval.

In some embodiments, the at least one processor may be configured to filter the at least one enriched query string using the at least one metadata by applying a threshold criterion to exclude modified query strings corresponding to metadata that do not meet predetermined data quality standards.

In some embodiments, the at least one processor may be configured to query the at least one database with the at least one structured data format-based query string by generating a plurality of SQL queries and selecting at least one SQL query based on an accuracy evaluation in retrieving relevant structured data.

In some embodiments, the at least one processor may be further configured to concurrently input the plurality of query responses into the at least one relevance machine learning model to expedite a generation of the plurality of ranked query responses.

In some embodiments, the plurality of agents may include agents specialized for processing data the at least one vector database, the at least one relational database, the at least one graph database, or any combination thereof; and where the selection of the at least one selected agent may be based on the data type stored in the at least one database.

In some embodiments, the at least one processor may be further configured to using a consensus-based validation mechanism where multiple agents independently verify an accuracy and a relevance of the plurality of query responses prior to their ranking by the at least one relevance machine learning model.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:

iteratively populating, by at least one processor, at least one database with a plurality of governmental data elements by:

obtaining source data from a plurality of governmental data sources at predefined times, iteratively transforming the source data to the plurality of governmental data elements using at least one database schema, and iteratively populating the at least one database with the plurality of governmental data elements based on the at least one database schema;

wherein the at least one database is at least one of:

at least one vector database having at least one vector database schema, at least one relational database having at least one relational database schema, or at least one graph database having at least one graph database schema;

receiving, by the at least one processor, at least one user query from a user, comprising at least one query string, to obtain at least one query-related governmental data element from the plurality of governmental data elements stored in the at least one database;

performing, by the at least one processor, using at least one routing agent:

a determination of a data type, a semantic scope, or both, of the at least one query string and a selection of at least one selected agent from a plurality of agents, based on the determination of the data type, to further modify the at least one user query;

wherein the plurality of agents comprises:

at least one structured data agent, at least one unstructured data agent, at least one graph data agent, at least one semantic search agent, at least one validation agent, at least one bias mitigation agent, or at least one fallback agent;

executing, by the at least one processor, the at least one selected agent to modify the at least one user query by:

obtaining at least one metadata from the at least one database, modifying the at least one query string based at least in part on the at least one metadata to obtain a plurality of modified query strings;

when a first portion of at least one first modified query string of the plurality of modified query strings requires at least one first response comprising structured data:

converting, by the at least one processor, the first portion of the at least one first modified query string to at least one structured data format-based query string and querying, by the at least one processor, the at least one database with the at least one structured data format-based query string to receive the at least one first response;

when a second portion of at least one second modified query string of the plurality of modified query strings requires at least one second response comprising unstructured data:

applying, by the at least one processor, at least one natural language processing (NLP) model, at least one trained machine learning model, or any combination thereof to the second portion of the at least one second modified query string to generate at least one enriched query string;

filtering, by the at least one processor, the at least one enriched query string using the at least one metadata; and querying, by the at least one processor, the at least one database with the at least one enriched query string to obtain the at least one second response;

receiving, by the at least one processor, a plurality of query responses to the at least one structured data format-based query string, the at least one enriched query string, or any combination thereof;

wherein the plurality of query responses comprises the at least one first response, the at least one second response, or any combination thereof;

inputting, by the at least one processor, the plurality of query responses into at least one relevance machine learning model;

determine, by the at least one relevance machine learning model, a relevance score for each query response from the plurality of query responses, and rank, by the at least one relevance machine learning model, each query response based on the relevance score to generate a plurality of ranked query responses;

wherein the relevance score is a comparison between a particular query response of the plurality of query responses and the at least one user query; and outputting, by the at least one processor, the plurality of ranked query responses to the user.

2. The method of claim 1, wherein the at least one relevance machine learning model is trained using historical user queries, feedback, or both.

3. The method of claim 1, wherein the at least one metadata comprises at least one of: entity relationships, timestamps, source identifiers, or any combination thereof.

4. The method of claim 1, wherein the plurality of query responses comprises at least one of: textual summaries, tables, downloadable files, or any combination thereof.

5. The method according to claim 1, further comprising concurrently selecting, using the at least one routing agent comprises a large language learning model (LLM)-based agent, and execute at least two agents from the plurality of agents based on the determination of the data type, the semantic scope, or both, of the at least one query string.

6. The method according to claim 1, further comprising iteratively updating the at least one database in real time by incorporating additional governmental data elements obtained from the plurality of governmental data sources at the predefined times.

7. The method according to claim 1, wherein modifying the at least one query string comprises generating the plurality of modified query strings, each formatted for execution as either a structured data format-based query string or an enriched query string for unstructured data retrieval.

8. The method according to claim 1, wherein filtering the at least one enriched query string using the at least one metadata comprises applying a threshold criterion to exclude modified query strings corresponding to metadata that do not meet predetermined data quality standards.

9. The method according to claim 1, wherein querying the at least one database with the at least one structured data format-based query string comprises generating a plurality of structured query language (SQL) queries and selecting at least one SQL query based on an accuracy evaluation in retrieving relevant structured data.

10. The method according to claim 1, further comprising concurrently inputting the plurality of query responses into the at least one relevance machine learning model to expedite a generation of the plurality of ranked query responses.

11. The method according to claim 1, wherein the plurality of agents comprises agents specialized for processing data from the at least one vector database, the at least one relational database, the at least one graph database, or any combination thereof; and wherein the selection of the at least one selected agent is based on the data type stored in the at least one database.

12. The method according to claim 1, further comprising using a consensus-based validation mechanism where multiple agents independently verify an accuracy and a relevance of the plurality of query responses prior to their ranking by the at least one relevance machine learning model.

13. A system, comprising:

at least one memory for storing instructions; and at least one processor in communication with the at least one memory, the at least one processor being configured to execute the instructions to:

iteratively populate at least one database with a plurality of governmental data elements by:

obtaining source data from a plurality of governmental data sources at predefined times, iteratively transforming the source data to the plurality of governmental data elements using at least one database schema, and iteratively populating the at least one database with the plurality of governmental data elements based on the at least one database schema;

wherein the at least one database is at least one of:

at least one vector database having at least one vector database schema, at least one relational database having at least one relational database schema, or at least one graph database having at least one graph database schema;

receive at least one user query from a user, comprising at least one query string, to obtain at least one query-related governmental data element from the plurality of governmental data elements stored in the at least one database;

perform using at least one routing agent:

a determination of a data type, a semantic scope, or both, of the at least one query string and a selection of at least one selected agent from a plurality of agents, based on the determination of the data type, to further modify the at least one user query;

wherein the plurality of agents comprises:

at least one structured data agent, at least one unstructured data agent, at least one graph data agent, at least one semantic search agent, at least one validation agent, at least one bias mitigation agent, or at least one fallback agent;

execute the at least one selected agent to modify the at least one user query by:

obtaining at least one metadata from the at least one database, modifying the at least one query string based at least in part on the at least one metadata to obtain a plurality of modified query strings;

when a first portion of at least one first modified query string of the plurality of modified query strings requires at least one first response comprising structured data:

convert the first portion of the at least one first modified query string to at least one structured data format-based query string and query the at least one database with the at least one structured data format-based query string to receive the at least one first response;

when a second portion of at least one second modified query string of the plurality of modified query strings requires at least one second response comprising unstructured data:

apply at least one natural language processing (NLP) model, at least one trained machine learning model, or any combination thereof to the second portion of the at least one second modified query string to generate at least one enriched query string;

filter the at least one enriched query string using the at least one metadata; and query the at least one database with the at least one enriched query string to obtain the at least one second response;

receive a plurality of query responses to the at least one structured data format-based query string, the at least one enriched query string, or any combination thereof;

wherein the plurality of query responses comprises the at least one first response, the at least one second response, or any combination thereof;

input the plurality of query responses into at least one relevance machine learning model;

determine, by the at least one relevance machine learning model, a relevance score for each query response from the plurality of query responses, and rank, by the at least one relevance machine learning model, each query response based on the relevance score to generate a plurality of ranked query responses;

wherein the relevance score is a comparison between a particular query response of the plurality of query responses and the at least one user query; and output the plurality of ranked query responses to the user.

14. The system according to claim 13, wherein the at least one relevance machine learning model is trained using historical user queries, feedback, or both.

15. The system according to claim 13, wherein the at least one metadata comprises at least one of: entity relationships, timestamps, source identifiers, or any combination thereof.

16. The system according to claim 13, wherein the plurality of query responses comprises at least one of: textual summaries, tables, downloadable files, or any combination thereof.

17. The system according to claim 13, wherein the at least one processor is configured to concurrently select and execute, using the at least one routing agent comprises a large language learning model (LLM)-based agent, at least two agents from the plurality of agents based on the determination of the data type, the semantic scope, or both, of the at least one query string.

18. The system according to claim 13, wherein the at least one processor is configured to iteratively update the at least one database in real time by incorporating additional governmental data elements obtained from the plurality of governmental data sources at the predefined times.

19. The system according to claim 13, wherein the at least one processor is configured to modify the at least one query string by generating the plurality of modified query strings, each formatted for execution as either a structured data format-based query string or an enriched query string for unstructured data retrieval.

20. The system according to claim 13, wherein the at least one processor is configured to filter the at least one enriched query string using the at least one metadata by applying a threshold criterion to exclude modified query strings corresponding to metadata that do not meet predetermined data quality standards.

21. The system according to claim 13, wherein the at least one processor is configured to query the at least one database with the at least one structured data format-based query string by generating a plurality of structured query language (SQL) queries and selecting at least one SQL query based on an accuracy evaluation in retrieving relevant structured data.

22. The system according to claim 13, wherein the at least one processor is further configured to concurrently input the plurality of query responses into the at least one relevance machine learning model to expedite a generation of the plurality of ranked query responses.

23. The system according to claim 13, wherein the plurality of agents comprises agents specialized for processing data from the at least one vector database, the at least one relational database, the at least one graph database, or any combination thereof; and wherein the selection of the at least one selected agent is based on the data type stored in the at least one database.

24. The system according to claim 13, wherein the at least one processor is further configured to use a consensus-based validation mechanism where multiple agents independently verify an accuracy and a relevance of the plurality of query responses prior to their ranking by the at least one relevance machine learning model.

* * * * *